(12) United States Patent
Petrangeli et al.

(10) Patent No.: US 10,907,742 B2
(45) Date of Patent: Feb. 2, 2021

(54) SELECTOR DEVICE

(71) Applicant: SEKO S.P.A., Cittaducale (IT)

(72) Inventors: Gabriele Petrangeli, Cittaducale (IT);
Francesco Fiorentino, Cittaducale (IT)

(73) Assignee: SEKO S.P.A., Cittaducale (IT)

( * ) Notice: Subject to any disclaimer, the term of this patent is extended or adjusted under 35 U.S.C. 154(b) by 227 days.

(21) Appl. No.: 16/084,179

(22) PCT Filed: Mar. 15, 2017

(86) PCT No.: PCT/IB2017/051490
§ 371 (c)(1),
(2) Date: Sep. 11, 2018

(87) PCT Pub. No.: WO2017/158521
PCT Pub. Date: Sep. 21, 2017

(65) Prior Publication Data
US 2020/0292090 A1    Sep. 17, 2020

(30) Foreign Application Priority Data

Mar. 16, 2016 (IT) .............................. UA2016A1724

(51) Int. Cl.
*F16K 11/074* (2006.01)
*F16K 31/528* (2006.01)
(52) U.S. Cl.
CPC ...... *F16K 11/0743* (2013.01); *F16K 31/5286* (2013.01)

(58) Field of Classification Search
CPC .............. F16K 11/0743; F16K 11/074; Y10T 137/86863; Y10T 137/86823; Y10T 137/86533
USPC .......................... 137/625.46, 625.41, 625.15
See application file for complete search history.

(56) References Cited

U.S. PATENT DOCUMENTS

| 5,653,261 A | * | 8/1997 | Dalhart ............... F16K 11/0743 |
| | | | 137/625.11 |
| 7,377,291 B2 | * | 5/2008 | Moon ................... F16K 11/074 |
| | | | 137/553 |
| 9,638,340 B2 | * | 5/2017 | Bachofer ............ F16K 11/0743 |

* cited by examiner

*Primary Examiner* — Michael R Reid
(74) *Attorney, Agent, or Firm* — McAfee & Taft

(57) ABSTRACT

The present disclosure relates to a selector device configured to allow a selection of a fluid in a mixing system.

The overall configuration of the device being such that in an operative condition of selection of a specific fluid said one or more connection ports are translated in a sealed way on said face along said curvilinear trajectory through said manoeuvring means until an overlapping position of said one or more connection ports with respect to said outlet mouth of the inlet channel of the specific fluid, and said suction mouth of the suction channel, said outlet mouth and said suction mouth being positioned at said face.

18 Claims, 6 Drawing Sheets

E-E

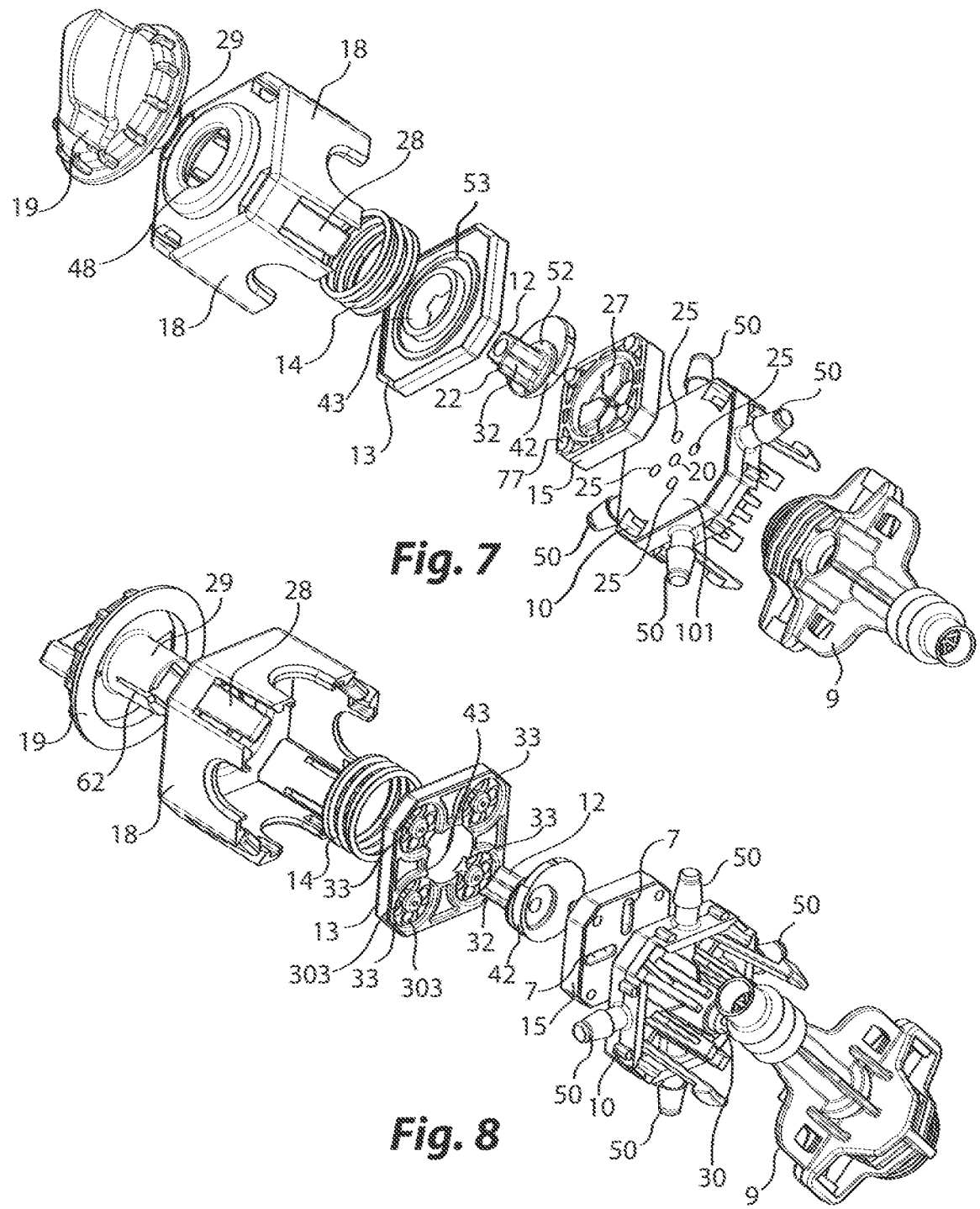

SELECTOR DEVICE

The present invention relates to a selector device.

More precisely, the present invention relates to a selector device conformed to allow the selection of a specific fluid in a distribution system and/or in a mixing system with a further fluid, for example through a venturi system.

The selector devices of this kind usually comprise a main body with a plurality of supplying mouths of a respective plurality of fluids, and an outlet mouth through which the selected fluid is sucked. An operator can select a specific connection of the outlet mouth with the desired supplying mouth, by actuating a rotatable knob, allowing the delivery of the selected fluid and the same time preventing the leakage of other fluids.

One of the most frequent defects of the of known selector device is that during the shift selection step from a first fluid to a second fluid, a residual amount of the first fluid remains within a connection channel between the supplying mouth and the outlet mouth. In order to prevent unwanted contamination between different fluids, therefore, purge operations before proceeding to the mixing of a second fluid are necessary.

Obviously, the problem of the fluid residue and the possible contamination is much more current and frequent as more numerous are the different fluids which must be mixed.

The necessary precautions to prevent the possibility of contamination are expensive both in terms of amount of discarded material, for example in the purge step, and in terms of operating times to pass from the supply of a first fluid to the provision of a second fluid.

Therefore, the technical problem posed and solved by the present invention is to provide a selector device which allows to obviate the drawbacks mentioned above with reference to the prior art.

This problem is solved by a device according to claim 1.

Preferred features of the present invention are present in the dependent claims.

Advantageously, the selector device according to the present invention comprises a main body having a plurality of supplying mouths of a plurality of fluids and a supplying mouth for dispensing the selected fluid and selecting means for the selection of the desired fluid which allow in a simple, reliable, efficient and economical way to increase the efficiency of the selection and supplying operations allowing to speed up the mixing operations and limiting the risk of contamination between different fluids.

A further advantage of the selector device according to one embodiment of the present invention is that it allows obtaining a specific passage channel for each supplied fluid, drastically reducing material waste during the transition steps of the different fluids.

Other advantages, features and employing ways of the present invention will become evident from the following detailed description of some embodiments, presented for illustrative purposes and not limiting.

The present invention will now be described, for illustrative but not limitative purposes, according to its preferred embodiments, with particular reference to the Figures of the accompanying drawing, in which:

FIG. 7 shows an axonometric view from above of an exploded view of the device in FIG. 1;

FIG. 8 shows an axonometric view from below of the exploded view of FIG. 1;

Figure 1:
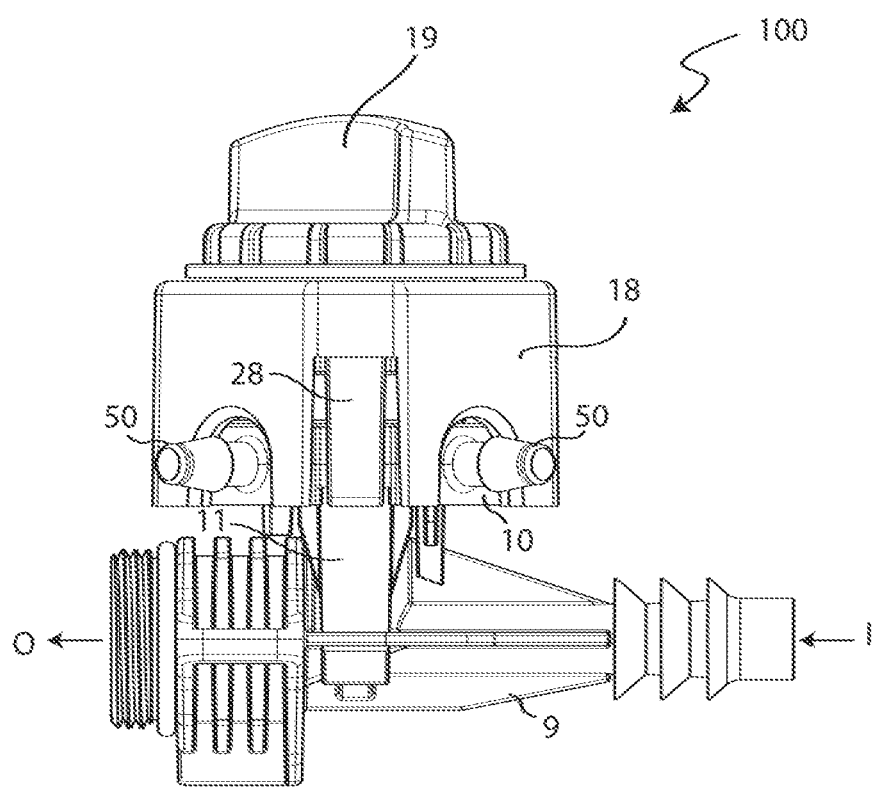
FIG. 1 shows a side view of the selector device according to a first embodiment of the present invention.
Figure 2:
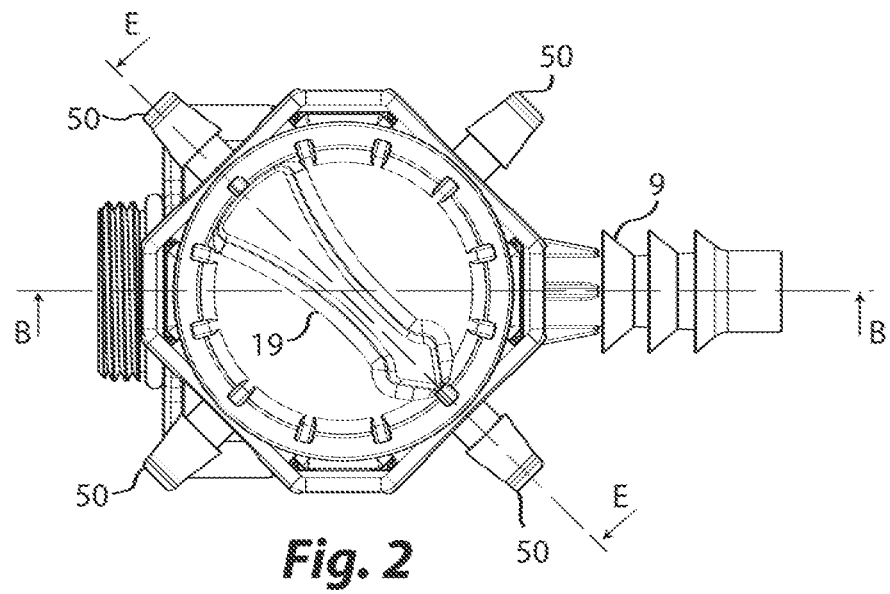
FIG. 2 shows a top view of the device in FIG. 1.

An embodiment of the invention according to the present invention, as shown in FIG. 1, includes a selector device 100 configured to allow a selection of a specific fluid in a mixing system, comprising a fluid dosing and mixing system.

The selector device 100 according to the present invention comprises a main body 10 having at least one supplying mouth 50 for supplying a fluid, such as a chemical agent or detergent, which must be mixed or dosed, and a distribution mouth 30 through which the selected fluid flows in a mixing device 9, optionally based on the Venturi effect. In the described example, the selector device 100 comprises four supplying mouths 50 for supplying the respective fluids.

Figure 3:
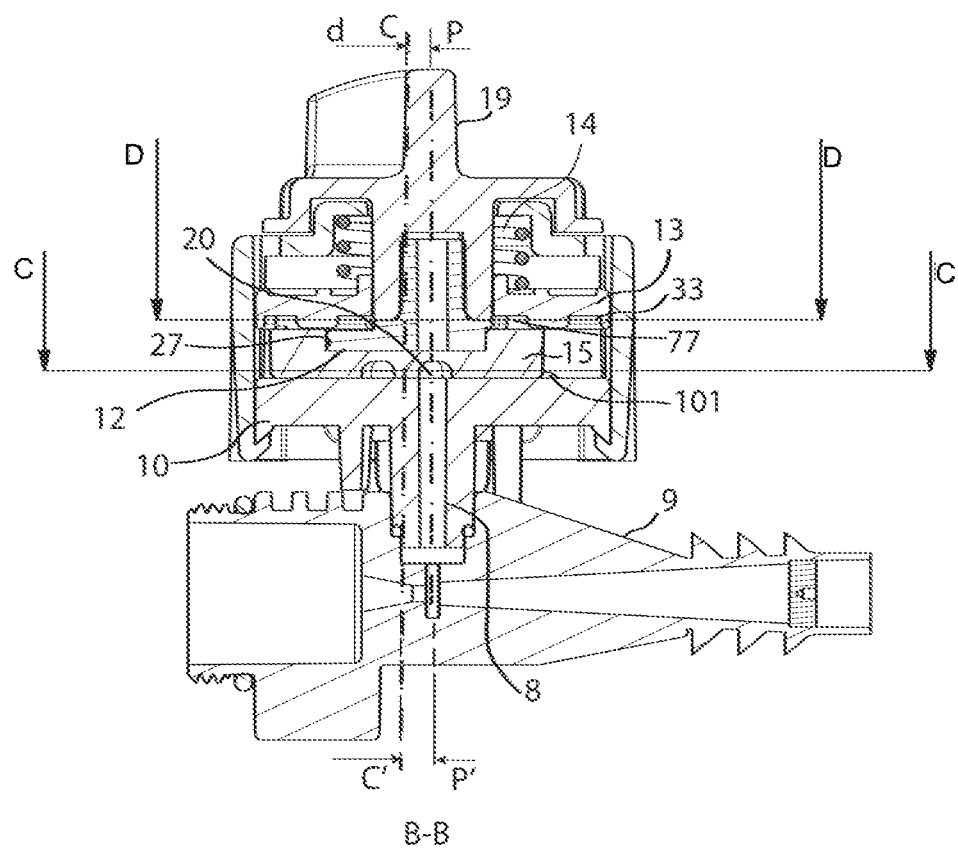
FIG. 3 shows a cross-sectional view, whose section plane is indicated in FIG. 2.
Figure 4:
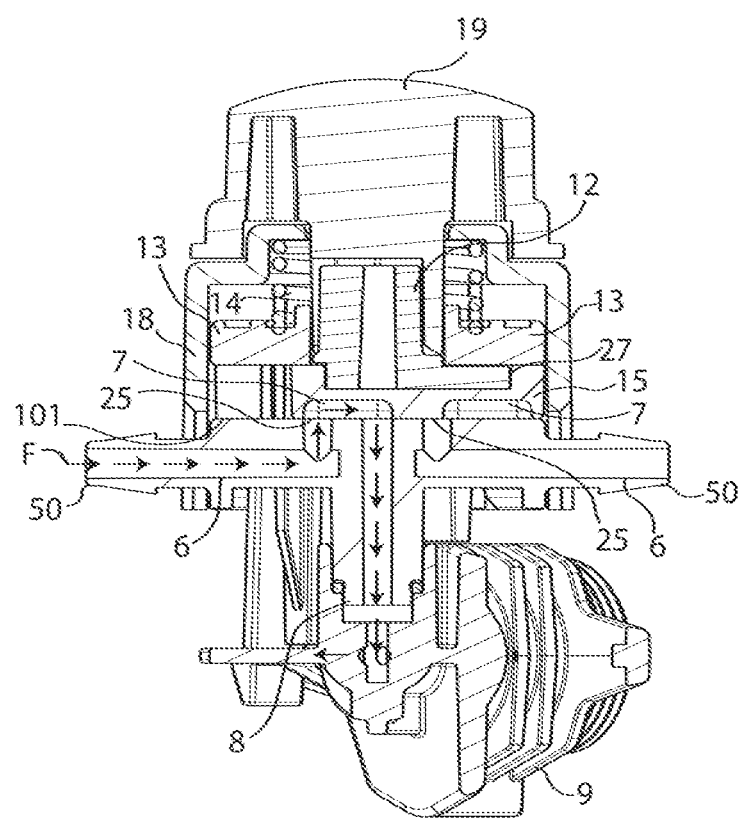
FIG. 4 shows a further cross-sectional view, whose section plane is indicated in FIG. 2.
Figure 5:
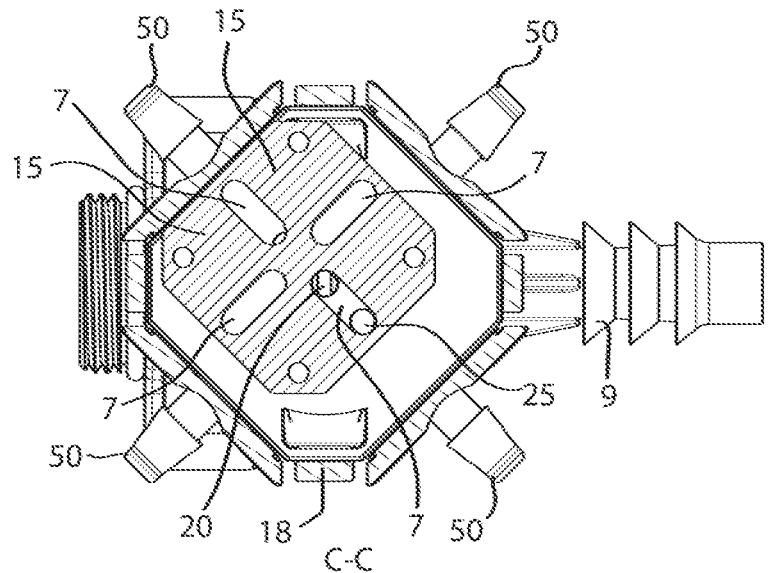
FIGS. 5 and 6 are views at different longitudinal sections, with section planes respectively indicated in FIG. 3.

As shown in FIGS. 3 and 4, and in FIG. 7, the main body 10 comprises a distribution plate, having a substantially planar face 101 and a suction mouth 20 positioned at a central portion of the face 101.

The distribution plate, as will be described in more detail below, has a polygonal shape, preferably having a number of main sides equal to the number of the supplying mouths 50.

In the described example, the distribution plate has a substantially square shape, having four main lateral walls.

Alternative embodiments may provide for example a triangular, pentagonal or hexagonal conformation of the distribution plate to allow the selection of a fluid by respective three, five or six supplying mouths.

As shown in FIG. 4, the main body 10 further includes a suction channel 8 that connects the suction mouth 20 to the distribution mouth 30 shaped to be connected with the mixing device 9. The suction channel 8 is preferably shaped as a cylindrical body coaxial to a main symmetry axis of the distribution plate. The inlet mouths 50 are positioned at a lateral surface of the distribution plate and are preferably equidistant from one another. In particular, in the embodiment here described, the supplying mouths 50 are four and are spaced approximately 90 degrees from one another.

On the face 101 of the distribution plate four outlet mouths 25 are also provided, each mouth 25 is positioned at the end portion of an inlet channel 6 of the specific fluid supplied at a respective supplying mouth 50. In the described example, the outlet mouths 25 are positioned, preferably equidistant from one another, around the suction mouth 20, preferably each outlet mouth 25 is positioned at a same radial distance from the suction mouth 20.

In particular, in the embodiment here described, the outlet mouths 25 are four and are spaced approximately 90 degrees from one another.

Preferably, each inlet channel 6 develops, in a way substantially coplanar with the face 101 of the distribution plate, from a supplying mouth 50 to an area in proximity to the suction channel 8.

In proximity to the channel 8, the inlet channel 6 has a sharp bend and continues its development along a portion substantially parallel to the suction channel 8, up to the outlet month 25.

In particular, at the sharp bend, the surfaces of the inlet channel 6 are suitably shaped in order to reduce the presence of internal sharp edges and the consequent unwanted load losses.

The selector device 100 according to an embodiment of the present invention comprises a sealing plate 15 comprising a substantially planar face that has at least one connecting port 7 shaped to connect an inlet channel 6 to the suction channel 8 and to allow the suction of the selected fluid.

The sealing plate, as will be described in more detail below, has a polygonal shape, preferably having a number of main lateral walls equal to the number of supplying mouths 50.

In the described example, the sealing plate has a substantially square shape, having four main lateral walls.

Alternative embodiments, may provide for example a triangular, pentagonal or hexagonal conformation of the sealing plate, to allow the selection of a fluid respectively from three, five or six supplying mouths.

As shown in FIGS. 4, 7 and 8, in the embodiment herein described, the sealing plate 15 has four connecting ports 7. In the described example, the connecting ports 7 extend along a radial direction and are preferably positioned equidistant from one another, around a center of the plate 15. In particular, each connecting port 7 is positioned at a same radial distance from the center of the plate 15.

Each connecting port 7 is shaped to allow, in an operative condition, the sliding of the specific selected fluid between the specific outlet mouth 25 and the suction mouth 20. In an assembly configuration in fact, the substantially planar face of the sealing plate 15 is slidably coupled to the face 101 of the main body in such a way that it can be shifted to the face 101, as will be described in more detail below, to allow communication between the outlet 25 of the selected fluid and the suction mouth 20 via a connecting port 7 and at the same time to prevent the leakage of the further fluid or of the additional fluids.

As better shown in FIGS. 4 and 8, each connecting port 7 has a cross section dimensionally equivalent to the cross section of a channel 6 in such a way as not to interfere with the flow value of the selected fluid, which flows from the inlet mouth 50 to the outlet mouth 30, in an operative condition, to be placed in the mixer device 9. Advantageously, the inner walls of the connecting port 7 are suitably shaped in order to avoid the presence of internal sharp edges and to avoid the consequent unwanted load losses.

A further face of the sealing plate 15, which in a mounting configuration is facing to a knob of the device, has a central recess 27. The recess 27 has a substantially cylindrical shape.

In the embodiment herein described, the recess 27 has a circular edge and has a maximum depth H, considered from the base surface of the recess 27, preferably equal to about half of the total thickness of the plate 15. The maximum depth H, is dimensioned to accommodate a base 42, as will be described in more detail below.

In the embodiment shown in FIG. 7, the maximum depth H is considered from four basic surfaces, which are mutually coplanar and are positioned at, and superiorly to, each connecting port 7.

The selector device 100 according to the present invention further comprises manoeuvring means of the sealing plate 15, configured to translate the plate respect to the face 101, according to a curvilinear trajectory, in particular a circular trajectory.

The manoeuvring means of the described embodiment comprises a rotatable pin 12 provided with a gripping stem 22, which extends along a main rotation axis PP' of the pin, and a base 42 preferably shaped as a disc. The base 42 is dimensioned in such a way that it can be inserted into the recess 27 and rotatably coupled to the cylindrical wall of the recess 27. In particular, the base 42 is integrally connected to the stem outlet 22, therefore, in a rotation condition of the pin, the base 42 is set in rotation about the main axis PP'.

Advantageously, the pin 12 is shaped as an eccentric. In particular, the coupling between the base 42 and the stem 22 of the pin 12 is an eccentric coupling. In the described example, a CC' axis passing through a geometric center C of the base 42 is spaced by a distance d from the main axis PP'. Therefore, to a rotation 22 of the stem around the main axis PP' corresponds a rotation of the center C, and each point P of the base 42 spaced from the main axis PP', around the same main axis PP'.

As will be described in more detail below, in an operative condition, a portion of the lateral surface of the base 42 is brought into abutment with a lateral portion of the recess 27 and then transfers to the sealing plate 15 a part of the stress arising from a rotation of the stem 22.

The sealing plate 15 is then dragged by the rotation of the base 42, along a curvilinear trajectory, in particular substantially circular, defined by a motion around the principal axis PP'.

The manoeuvring means of the selector device 100 described herein further comprise a positioning disk 13 shaped to guide a translation of the sealing plate 15.

Figure 6:
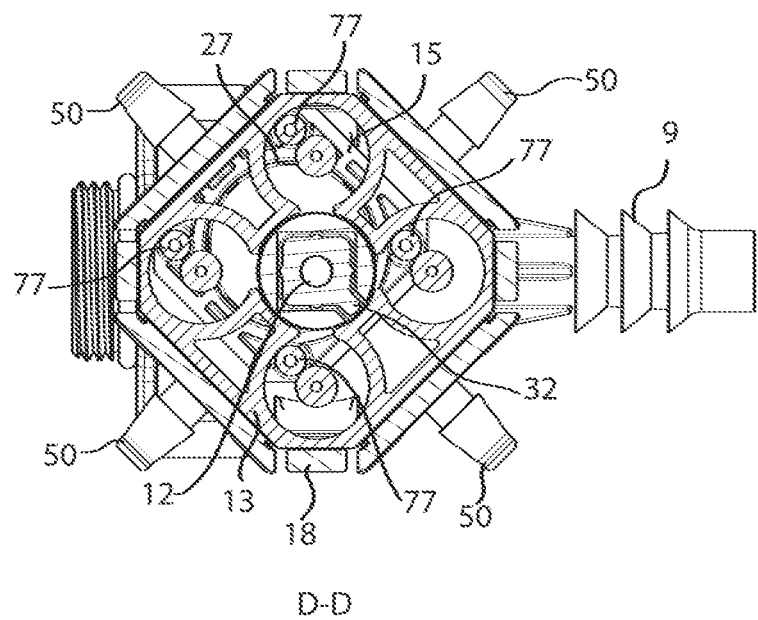

With reference to the more detailed views of the selector device, in particular to FIGS. 3, 6 and 8, the positioning disk 13 includes a central hole 43, at which the disc is adjusted on the pin 12. In the described example, the base 42 of the pin has a substantially circular projection 52, configured to guide the adjusting of the positioning disk 13 on the pin 12 and to ensure a coaxiality between a symmetry axis of the central hole 43 and the main central axis PP' around which the stem 22 rotates.

In an assembly configuration, and with the positioning disk 13 in a keyed configuration onto the pin 12, an extension surface of the positioning disk 13 acts as an axial constraint for the sealing plate 15, preventing undesired displacements along the main axis PP'.

The sealing plate 15 therefore maintains two movement freedom degrees on the plane defined by the face 101, respect to which the plate 15 is moved as a result of a rotation of the eccentric pin 12.

In order to constrain the plate to a translation along a curvilinear trajectory and to prevent a free rotation of the plate 15 respect to the base 42, further constraining means are provided.

In the present example, a first constraint to the translation along a curvilinear trajectory of the plate is constituted by the coupling of the eccentric pin 12 with the plate 15, which determines the rotation of the center of the base 42, which coincides with the center of the sealing plate 15. Further constraining means, necessary to ensure that each point of the sealing plate 15 is moved along arcs of circumference parallel to each other, comprise at least one coupling between a projecting element 77 positioned at the sealing plate 15 and a guiding recess 33 positioned on a face of the positioning disk 13 facing towards the sealing plate 15.

Preferably, a guiding recess 33 is shaped as a circular crown dimensioned to accommodate, and constrain, a displacement of the projecting element 77. In particular, the difference between the radius of the bigger circle and the radius of the smaller circle is substantially equal to the diameter of the hemispherical cap of the projecting element 77. Further, the distance of a midpoint of the circular crown from the center of the crown is equal to the distance of the center of the base 42 from the main axis PP', in particular is equal to d.

Therefore, advantageously, in an operative condition, a rotation of a point of the projecting element 77 around an axis centred at the middle of the circular crown corresponds to a rotation of a central point C of the sealing plate 15 around the main axis PP'. Rotations are made along arcs of circumference parallel to each other.

In addition, the guiding recess 33 provides a stabilizing portion 303. The stabilizing portion 303 is shaped to house, in a shaped coupling way, the hemispherical end of the projecting element 77, therefore it is preferably designed as a hemispherical depression along the circular crown of the guiding recess 33.

In particular, for each guiding recess 33, a number of stabilizing portions 303 equal to the number of the detergent supplying mouths is provided, in order to stabilize—as will be described in more detail below—the position of the sealing plate 15, and in particular of the connecting ports 7, during a suction phase of the selected fluid.

To ensure the maintenance of a constant orientation of the sealing plate 15 during the translation along the curvilinear trajectory, a plurality of constraining means is provided, for example a number equal to the number of fluid supplying mouths 50.

In the described example, as shown in FIG. 7, a plurality of four protruding elements 77 is provided. The protruding elements 77 are positioned at a same radial distance from the edge of the recess 27 and preferably equally spaced from one another. In the embodiment herein described, the four elements 77 are mutually spaced by approximately 90 degrees. In particular, each projecting element 77 is positioned at an area of the sealing plate 15 comprised between two connecting ports 7. As shown in FIGS. 7 and 8, each projecting element 77 is spaced from a connecting port 7, in particular is positioned on a radius of the plate 15 spaced approximately 45 degrees from a radius along which develops the connecting port 7.

Figure 9:
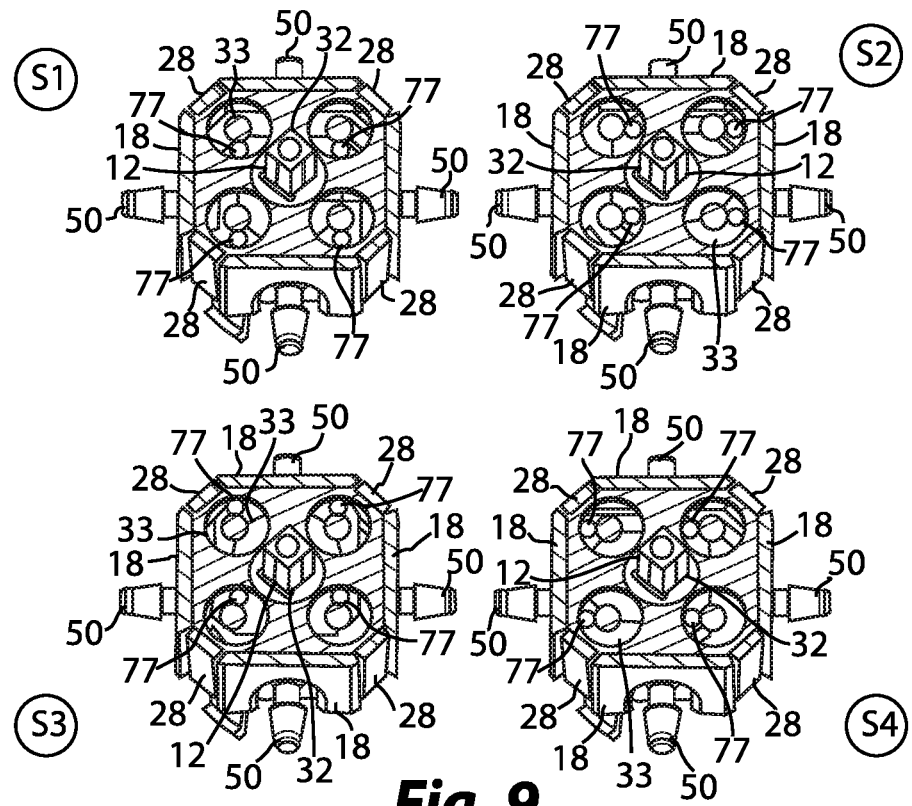
FIG. 9 shows a sequence of four operating positions of a selection pin of the selector device of FIG. 1.

As shown in FIGS. 6 and 9, for each projecting element 77 on the sealing plate 15, a respective guiding recess 33 on the positioning disc is provided, in order to ensure the coupling between the components of the device in a mounting configuration.

The coupling between the components described so far, in particular the axial coupling between the main body 10, the sealing plate 15 and the manoeuvring means of the sealing plate 15, comprising the pin 42 and the positioning disk 13, is guaranteed by the presence of a containing body 18 substantially box shaped. The containing body 18 has a compartment in which the above mentioned components are housed in sequence.

The containing body has a polygonal shape, preferably having a number of main sides equal to the number of supplying mouths 50.

Alternative embodiments may provide for example a triangular, pentagonal or hexagonal conformation of the containing body to allow the selection of a fluid respectively from three, five or six supplying mouths.

In the described example, the containing body 18 has a substantially square shape, with four main lateral walls in such a way to contain the positioning disk in a substantially coupling shaped way. Advantageously, the general conformation ensures that in an assembly configuration, the positioning disk can be axially moved while rotation movements or translational movements, in a plane perpendicular to the main axis, are prevented.

On an upper surface of the containing body 18 a hole is provided, to allow the exit of the stem of the pin 12 and the actuation of the manoeuvring means by an operator.

The lateral walls of the containing body 18 are shaped in order to provide apertures to allow the exit of the supplying mouths 50. The containing body 18 comprises hooking means shaped to lock axially the containing body 18 to the main body 10.

As shown in FIGS. 7 and 8, the hooking means of one embodiment of the device according to the present invention comprise lateral snap tabs 28 positioned at a junction portion between the side walls of the containing body 18. The tabs are shaped to abut in a snapping way at a lateral edge of the distribution plate.

Advantageously, the manoeuvring means also comprise an elastic element 14, for example shaped like a spring, positioned in a mounting configuration between the upper wall of the containment body and the positioning disk 13. In particular, at a face of the positioning disc, facing towards the containing body 18, a seat for receiving the spring 14 is provided. For example, as shown in FIG. 7, the receiving seat of the spring 14 is comprised between a containing edge 53 concentric with the hole 43 and an edge of the hole 43. In an alternative embodiment the realization of a recess on the positioning disc is provided to receive the spring 4.

The positioning of the elastic element 14 between the containing body 18 and the positioning disk 13, in particular in a compression configuration, guarantees the maintenance of the coupling between the components of said manoeuvring means and at the same time allows an axial movement of the positioning disk 13 at an operating condition of the selector device 100, as will be described in more detail below.

In particular, the elastic element 14 guarantees a maintaining of the coupling between the positioning disk 13 and the sealing plate 15.

To facilitate the operability of the manoeuvring means of the sealing plate 15, the device 100 according to the embodiment shown in FIGS. 1, 7 and 8, comprises a selection knob 19.

The knob 19 comprises a cylindrical protrusion 29 shaped to accommodate the stem portion 22 of the pin 12 that protrudes from the containment body. In particular, the cylindrical protuberance 29 provides a longitudinal opening 62 shaped to receive in a coupling way a longitudinal rib 32 of the stem 22. As shown in FIG. 8, the longitudinal rib 32 is formed at a pin stem portion which is aligned, in an assembly configuration, with the connecting port 7 which puts in communication the suction mouth 20 with the selected outlet mouth 25. In other words, in an operative configuration of the device, the longitudinal rib 32 is directed toward the selected supplying mouth 50.

The knob 19 also comprises an upper protuberance shaped in an ergonomic way to be held between the fingers of an operator during the selection operations.

The upper projection includes a tapered portion shaped to function as an indicator. In particular, the tapered portion is formed in proximity to the longitudinal opening 62. Advantageously, in an assembly configuration the tapered portion, as well as the longitudinal rib 32, is faced toward the selected supplying mouth 50 thus providing the operator with information on the specific selected fluid.

An interference between the rib 32 and the longitudinal opening 62 in the mounting configuration ensures the rotation driving of the pin 12 as a result of a rotation of the selection knob by the operator.

Therefore, in an operating configuration, the operator of the selector device 100 may select a specific supplying mouth 50 by rotating the knob until an orientation of the tapered portion directed toward the desired mouth 50 is obtained.

Figure 10:
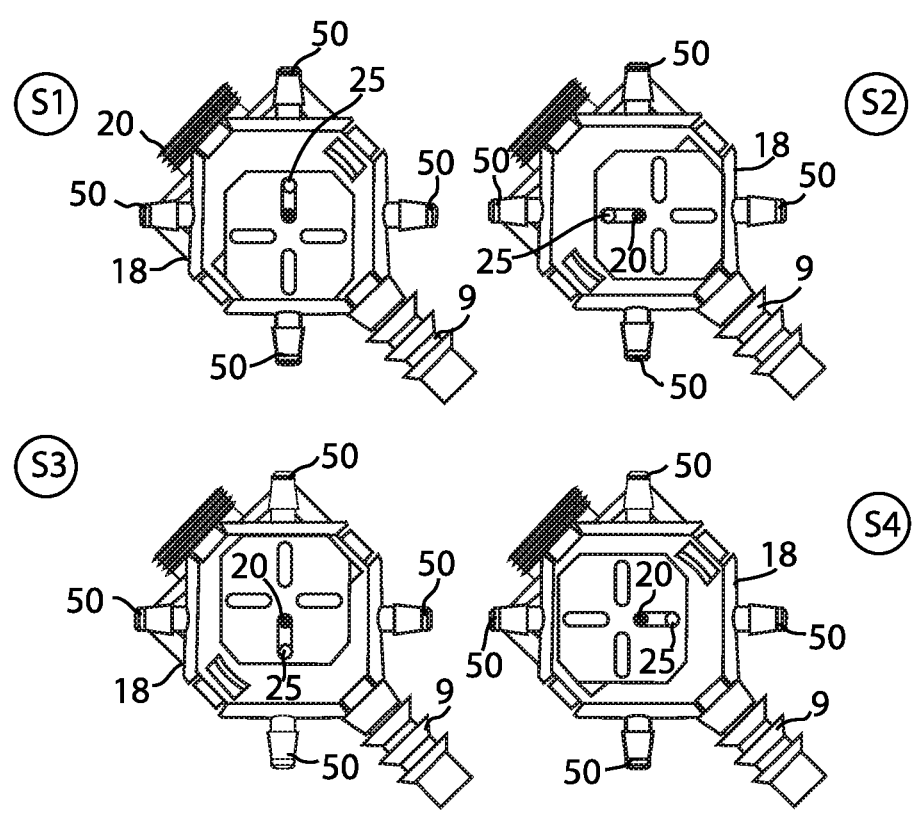
FIG. 10 shows the positioning of the selecting plate in the four operating positions of FIG. 9.

As shown in FIGS. 9 and 10, the selection of a first supplying mouth 50 (configuration S1, in both the Figures) results in a translation of the sealing plate 15 according a circular trajectory, as described above. The translation of the sealing plate 15, carries a first connecting port 7 at the outlet mouth 25 connected to the first selected supplying mouth 50 and simultaneously blocks the remaining outlet mouths 25 located on the face 101.

By rotating the pin in a counterclockwise direction (S2 configuration, FIG. 9), the sealing plate 15 is translated along an arc of circumference until a second connecting port 7 is brought at the outlet mouth 25 connected to the second selected supplying mouth 50 and simultaneously it obstructs the remaining outlets mouths 25 located on the face 101 (S2 configuration, FIG. 10).

A further counterclockwise rotation of the pin (S3 configuration, FIG. 9), provides a translation of the sealing plate 15 along a further arc of circumference until a third connecting port 7 is brought at the outlet mouth 25 connected to the third selected supplying mouth 50 and simultaneously it blocks the remaining outlet mouths 25 located on the face 101 (S3 configuration, FIG. 10).

Finally, an additional further counterclockwise rotation of the pin (S4 configuration, FIG. 9), provides a translation of the sealing plate 15 along an additional further arc of circumference until a fourth connecting port 7 is brought at the outlet mouth 25 connected to the fourth selected supplying mouth 50 and simultaneously it blocks the remaining outlet mouths 25 located on the face 101 (S4 configuration, FIG. 10).

Advantageously, the polygonal shape of the sealing plate 15 and of the containing body 18 allows a lateral wall of the plate 15 to go in abutment with a respective lateral wall of the containing body 18 at each operative position, thus ensuring further the maintenance of the stability of the plate 15 during a fluid suction operation.

FIG. 4 is a section of the operative configuration shown as S1 in FIGS. 9 and 10, and a plurality of arrows F indicate the path of the selected fluid from the supplying mouth up to the mixing device 9.

In particular, the Venturi mixing device 9 provides an inlet and an outlet mouth and a fluid, for example water, is fed a the inlet mouth, as indicated by the arrow I shown in FIG. 1. The Venturi 9 exerts a suction force at the distribution mouth 30 of the selector device. Therefore, the selected fluid is sucked into the Venturi 9 and mixed, for example with the water located in the Venturi. As shown in FIG. 1, the mixed fluid is expelled from the Venturi at the outlet mouth, as indicated by the arrow O shown in FIG. 1.

During a fluid suction phase, the sealing plate 15 is maintained in position thanks to the above mentioned constraining means. In particular, the above described shaped coupling between a projecting element 77 and the respective stabilizing portion 303 allows to keep the plate in position even as a result of any undesirable stresses, for example caused by a sudden change of flow or speed rate of the fluid in the channel 6 and/or in the connecting port 7. In particular, the four depressions 303 formed along the circular crown of each guiding recess 33, as shown in FIG. 8, allow to stabilize the coupling between the guiding recess 33 and the respective projecting element 77 at each of the described above four configurations S1-S4.

During the switch from a first configuration S1 to a second configuration S2, the rotation of the knob 19 results in the leakage of each projecting element 77 from the respective stabilizing portion 303. The positioning disk 13 is lifted, by the presence of the spring 14, to allow sliding of the projecting element 77 within the guiding recess 33 until a subsequent stabilizing portion 303 it is not intercepted, the hemispherical end of the projecting element 77 is positioned in the depression 303 and the positioning disk repositioned in abutment on the basis 42 of the pin 12.

At each of the four configurations, therefore, the sealing plate 15, will be stable as much as already described with reference to the first configuration S1 and, advantageously, the plate will be maintained in position even following any undesired stress.

The equidistance between the constraining elements, and so both between the protruding elements 77 and among the respective guiding recesses 33, allows an equitable distribution on the disk 13 of the elastic force transmitted by the spring 14, ensuring a movement of the sealing plate 15 always perpendicular to the working axis of the spring 14.

Advantageously, the overall configuration of the selector device 100 according to the present invention allows obtaining a connecting port 7 exclusively dedicated to a specific fluid thus avoiding the risk of contamination between different fluids.

In addition, a possible amount of residual fluid at a specific connecting port 7 can be supplied again into the mixing system as soon as the same fluid will be selected again. Advantageously therefore the material wastes are also reduced. The purge operations requested in the prior art devices, are therefore no more necessary.

Therefore, the selector device 100 according to the present invention allows increasing the efficiency of the mixing system both in terms of operating times that in terms of costs.

Advantageously, the components of the selector device 100 according to the present invention are made of steel, in order to optimize corrosion resistance.

In some applications, the components of the device according to the present invention can be made of plastic material to minimize further the manufacturing costs and the weight. For example, the components of the device according to the present invention can be realized in at least one of the materials selected from the group consisting of polypropylene (PP), polyethylene (PE), polyvinylidene fluoride (PVDF), plastic materials that guarantee a high level of chemical compatibility with most of the treated chemicals.

The preferred embodiments of this invention have been described and a number of variations have been suggested hereinbefore, but it should be understood that those skilled in the art can make other variations and changes without so departing from the scope of protection thereof, as defined by the attached claims.

The invention claimed is:
1. Selector device configured to allow a selection of a fluid in a mixing system, comprising:
a main body having at least three supplying mouths and a respective inlet channel through which a fluid is supplied and placed in the device and a suction channel through which the selected fluid flows from the selector device to the mixing system;
a polygonal sealing plate configured to be coupled to a substantially planar face of said main body, said sealing plate having a number of main side walls equal to the number of said supplying mouths and said sealing plate having one or more connecting ports shaped to connect each other to said inlet channel and said suction channel and to allow a suction of the selected fluid;

manoeuvring means operable by an operator configured to allow a translation of said sealing plate with respect to said substantially planar face of said main body in which said translation is effected along a curvilinear trajectory, the overall configuration of the device being such that in an operative condition of selection of a specific fluid said one or more connection ports are translated in a sealed way on said face along said curvilinear trajectory through said manoeuvring means until an overlapping position of said one or more connection ports with respect to an outlet mouth of the inlet channel of the specific fluid, and said suction mouth of the suction channel, said outlet mouth and said suction mouth being positioned at said face.

2. Selector device according to claim 1, wherein a number of said one or more connecting ports is equal to the number of said supplying mouths.

3. Selector device according to claim 1, wherein said manoeuvring means comprises a rotatable pin.

4. Selector device according to claim 3, wherein said rotatable pin comprises a base and a stem, said base having a geometric centre axially spaced from a symmetry axis of said stem.

5. Selector device according to claim 4, wherein said sealing plate is shaped to be coupled to said base.

6. Selector device according to claim 1, wherein said manoeuvring means comprises a positioning disk shaped to be coupled to said sealing plate.

7. Selector device according to claim 6, wherein said positioning disc has a polygonal shape having a number of main side walls equal to the number of said supplying mouths.

8. Selector device according to claim 7, comprising constraining means between said positioning disc and said sealing plate, shaped to guide the translation of the sealing plate respect to the face of the main body.

9. Selector device according to claim 8, wherein said constraining means comprises at least one projecting element at one face of the sealing plate facing said positioning disc, and at least one guiding recess at a face of the positioning disc facing the sealing plate.

10. Selector device according to claim 9, wherein said at least one guiding recess is shaped as a circular ring sized to house said at least one projecting element.

11. Selector device according to claim 9, wherein said at least one guiding recess comprises a stabilization portion shaped to house at least one end of said at least one projecting element.

12. Selector device according to claim 9, wherein each of said at least one guiding recess comprises a number of stabilizing portions equal to the number of said supplying mouths.

13. Selector device according to claim 6, wherein said manoeuvring means comprises an elastic element shaped to ensure the maintenance of a coupling configuration between said positioning disc and said sealing plate.

14. Selector device according to claim 1, further comprising a box-shaped containing body.

15. Selector device according to claim 14, wherein said containing body comprises hooking means shaped to lock axially the containing body to said main body.

16. Selector device according to claim 14, wherein said manoeuvring means comprises a rotatable pin and wherein said rotatable pin comprises a base and a stem, said base having a geometric centre axially spaced from a symmetry axis of said stem, wherein said containing body has a hole shaped to allow the release of the stem of the pin and the actuation by an operator of said manoeuvring means.

17. Selector device according to claim 8, wherein the number of constraining means is equal to the number of said supplying mouths.

18. Selector device according to claim 14, wherein said box-shaped containing body has a substantially polygonal configuration with a number of main side walls equal to the number of said supplying mouths.

\* \* \* \* \*